United States Patent
Ragsdale et al.

(10) Patent No.: US 6,395,797 B2
(45) Date of Patent: May 28, 2002

(54) REDUCTION OF COLOR DEGRADATION OF TRIPHENYLMETHANE POLYMERIC COLORANTS WITHIN POLYURETHANE FOAMS

(75) Inventors: Mark E. Ragsdale, Duncan; Sandy G. Belue, Landrum, both of SC (US)

(73) Assignee: Milliken & Company, Spartanburg, SC (US)

( * ) Notice: Subject to any disclaimer, the term of this patent is extended or adjusted under 35 U.S.C. 154(b) by 0 days.

(21) Appl. No.: 09/790,176

(22) Filed: Feb. 21, 2001

Related U.S. Application Data

(63) Continuation of application No. 09/586,517, filed on Jun. 2, 2000, now Pat. No. 6,294,590.

(51) Int. Cl.[7] .................................................. C08J 9/04
(52) U.S. Cl. ........................ 521/130; 521/128; 521/129; 521/131; 521/134; 521/137; 521/155; 521/170
(58) Field of Search ................................. 521/130, 134, 521/137, 131, 155, 170, 128, 129

(56) References Cited

U.S. PATENT DOCUMENTS

| | | | |
|---|---|---|---|
| 3,886,466 A | 5/1975 | Olstowski | |
| 4,709,002 A | 11/1987 | Younes | 528/53 |
| 4,731,427 A | 3/1988 | Younes | 528/53 |
| 4,812,523 A | 3/1989 | Toman | 525/162 |
| 5,028,635 A | 7/1991 | Nodelman | 521/130 |
| 5,112,877 A | 5/1992 | Barker et al. | 521/110 |
| 5,116,903 A | 5/1992 | Gebregiorgis | 524/589 |
| 5,149,458 A | 9/1992 | Nodelman | 252/182.26 |
| 5,442,034 A | 8/1995 | Primeaux, II | 528/60 |
| 5,730,896 A | * 3/1998 | Gillis et al. | 521/129 |
| 5,998,494 A | * 12/1999 | Hamilton | 521/129 |
| 6,294,590 B1 | * 9/2001 | Ragsdale et al. | 521/130 |

FOREIGN PATENT DOCUMENTS

| | | |
|---|---|---|
| EP | 0276452 A1 | 8/1988 |
| EP | 0350644 | 1/1990 |

\* cited by examiner

*Primary Examiner*—John M. Cooney, Jr.
(74) *Attorney, Agent, or Firm*—Terry T. Moyer; William S. Parks

(57) ABSTRACT

New, useful and surprisingly effective polymeric triphenylmethane colorant-containing compositions which exhibit very low color degradation within polyurethane foams. Generally during polyurethane foam production, certain amine-based hydroxyl-group containing catalysts deleteriously attack the nitrogen linking groups within triphenylmethane polymeric colorants. Such compositions require the presence of nominal yet effective amounts of organic cyclic ester materials. The ring systems of such materials appear to open during exposure to heat (during the foaming procedure) and release carboxylic acids into the foaming formulation. The tertiary amines become quenched by the carboxylic acids and thus do not exhibit degradation of the TPM-based chromophore. The resultant foams exhibit substantially uniform color throughout. The processes and resultant foams are also contemplated within this invention.

6 Claims, No Drawings

REDUCTION OF COLOR DEGRADATION OF TRIPHENYLMETHANE POLYMERIC COLORANTS WITHIN POLYURETHANE FOAMS

CROSS REFERENCE TO RELATED APPLICATIONS

This application is a continuation of application Ser. No. 09/586,517, filed on Jun. 2, 2000, which is now U.S. Pat. No. 6,294,590. This parent application is herein entirely incorporated by reference.

FIELD OF THE INVENTION

This invention relates to surprisingly effective polymeric triphenylmethane colorant-containing compositions which exhibit very low color degradation within polyurethane foams. Generally during polyurethane foam production, certain amine-based hydroxyl-group containing catalysts deleteriously attack the triphenylmethane (TPM) polymeric colorants. Such compositions require the presence of nominal yet effective amounts of organic cyclic ester materials. The ring systems of such materials appear to open during exposure to heat (during the curing process) and release carboxylic acids into the curing formulation. The tertiary amines become quenched by the carboxylic acids and thus do not attack the TPM chromophore of the polymeric colorant to an extent to cause any appreciable color loss. The resultant foams exhibit substantially uniform color throughout. The processes and resultant foams are also contemplated within this invention.

BACKGROUND OF THE PRIOR ART

Polyurethane products, such as foams, resins, and the like, have traditionally been colored by pigments, polymeric colorants, and dyes. Generally, these colorations are performed in situ during foam, resin, etc., formation. For instance, polymeric colorants (i.e., polyoxyalkylenated colorants), such as those described in U.S. Pat. No. 4,284,279 to Cross et al., have been introduced within polyol compositions during slabstock foam production. The "colored" polyol then reacts with an isocyanate composition, in the presence of a catalyst possibly, to form the desired colored foam. Pigments have also been added in the past, most notably in solid, paste, or powder form, to a polyol stream to form the same type of colored foam products. Such foamed products require the presence of a catalyst or catalysts to effectuate the desired reaction between the polyol and isocyanate components. The most prevalent catalysts, due to cost in producing, using, and disposing, are tertiary amine-based compounds. To reduce emissions of residual amine catalysts, the industry has turned to using hydroxyl-terminated type amine catalysts, most notably DMEA and DABCO TL catalysts (a blend of triethylene diamine and 2-[[2-dimethylamino)ethyl]methylamino]ethanol) and Texacot ZF10 (N,N,N'-trimethl-N'-hydroxyethyl-bis (aminoethyl)ether). These catalysts unfortunately present the ability to exaggerate certain problems within the resultant foams, most notably color loss and/or degradations. Apparently, such catalysts react readily with TPM-based chromophores within the polyurethane. The high temperatures associated with polyurethane foam production permits attack of the positively charged TPM polymeric colorant. With a strong positive charge on the base carbon of such a TPM chromophore, the hydroxyls present within the catalyst are drawn to the colorant and appear to react in some fashion to weaken the necessary strong color-producing positive charge. Such deleterious weakening of the TPM positive charge thus apparently causes a severe reduction in color within the foam media. Apparently, such high temperature (i.e., above about 165–185° C.) discolorations and degradations more readily occur between about 15 and 30 minutes after foam generation (after gelation and blowing of the foam-producing composition) has taken place. Without the presence of environmentally unfriendly and thus avoided CFC auxiliary blowing agents, the entire process becomes more excessively heated due to the absence of effective heat dissipation compounds. The high temperatures generated in such a manner thus increase the rate of attack by the hydroxyl of the catalyst on the TPM constituents. As a result, discrete areas within the middle of the final article are discolored as compared with the remaining portions of the article.

One specific, extremely troublesome, problem exists in the utilization of polymeric triphenylmethane colorants within polyurethane foam articles. Such colorants, which comprise highly desirable polyoxyethylene chains, polyoxypropylene chains, or both, provide extremely effective colorations to target polyurethane media. Being polymeric in nature, these colorants actually tend to react to and within the urethane monomers during polymerization. As a result, the color is integrated within the foam and provides excellent uniformity and depth throughout the entire article. However, certain polymerization blowing catalysts, which happen to be the desired catalysts throughout the industry, tend to attack the nitrogen linking groups (present between the TPM backbone and the polymeric chains), thereby degrading the colorants themselves and preventing effective colorations of the target foam article. This phenomenon is most likely caused by the high reactivity of the free amine or hydroxyl groups of the catalysts and their ability to attack the unprotected nitrogens (with free electrons) present on the TPM polymeric colorant.

Attempts at alleviating these particular problems have included the addition of relatively expensive, potentially environmentally unfriendly, and potentially toxic antioxidants, such as 2,6-di-t-butyl-4-methylphenol (BHT), octadecyl-3-(3,5-di-t-butyl-4-hydroxyphenyl)propanoate (Irganox® 1076, from Ciba Geigy), and octyl-3(3,5-di-t-butyl-4-hydroxyphenyl)propanoate (Irganox® 1135), within the curing process. This has proven ineffective, with little or no improvement in discoloration. Since there is a 15 to 30 minute window of opportunity to control high temperature exposures, some foam producers have practiced forced air cooling of the foam-producing composition in the past to reduce potential discoloration problems. Although such forced air cooling is not required in such an instance, there is a more pronounced color discoloration exhibited upon utilization of consistently high, more inexpensive curing, etc., higher temperatures. Furthermore, since polymeric TPM colorants are the most favorable coloring agents for producing blue and green hue foams, the ability to inexpensively provide readily available TPM colorations within polyurehtane foams is highly necessary. Alternative methods, either simpler and less inexpensive in nature, have not been forthcoming within the industry. As a result, any marked improvements in such a manner are of utmost importance within the polyurethane foam production industry. To date, again, there have been no significant or helpful improvements nor advancements disclosed within the pertinent prior art.

OBJECTS OF THE INVENTION

It is therefore an object of this invention to provide a relatively inexpensive and simple method of preventing color loss for polymeric triphenylmethane colorants within polyurehtane foam articles. A further object is to provide a method of reducing color degradation within polyurethane foam producing methods which utilize amine-based catalysts in combination with polymeric triphneylmethane colorants. A further object is to provide an easy-to-add liquid composition for introduction within polyurethane foam production procedures which effectively reduces and/or eliminates such color degradation problems associated with amine-based catalysts. A further objective of this invention is to provide a polymeric triphenylmethane colored polyurethane foam product which exhibits substantially no color loss or discolorations.

SUMMARY OF THE INVENTION

Accordingly, this invention is directed to a method of producing a polyurethane foam article comprising the steps of: a) providing a polyol composition; b) providing an isocyanate composition; wherein at least one of the compositions of steps "a" and "b" comprise at least polymeric triphenylmethane colorant; c) adding a composition comprising at most 3.0 php of an organic cyclic ester to either or both of the compositions in steps "a" and "b", above; d) reacting all of the compositions from steps "a", "b", and "c" together in the presence of a tertiary amine hydroxy-containing catalyst. The particular compositions from these steps including the organic cyclic ester and, optionally, at least one coloring agent, are also contemplated within this invention. Furthermore, a polyurethane foam article produced by these methods and/or exhibiting a substantially uniform coloration throughout is also contemplated within this invention.

In general, polyurethane foam is produced through the catalyzed polymerization of the reaction products of polyols and isocyanates. Such a reaction is well known throughout the polyurethane industry and has been practiced for many years. The potential number and types of polyols utilized within this invention are plentiful. Such a compound is defined as comprising at least two alcohol moieties, preferably at least three. The free hydroxyl groups react well with the isocyanates to form the urethane components which are then polymerized to form the desired polyurethanes. Blowing agents present within the polymerization step provide the necessary foam-making capability. Preferred polyols thus comprise between three and six alcohol moieties, comprising from between one and six carbon atoms per alcohol moiety. Most preferred is a typical trifunctional polyol. F3022 polyol, available from Lyondell.

Isocyanates, most preferred diisocyanates, are well known components of such polyurethane foams and include any compounds which possess at least one free cyanate reactive group, and most preferably two, although more may be utilized. Such compounds are may also be aliphatic or aromatic in nature. The most prominently utilized isocyanates, and thus the most preferred types for this invention, are toluene diisocyanate and methylene diisocyanate. The polyol is generally reacted with a slight excess of isocyanate (ratio of from 1:1.04 to 1:1.12) to produce a soft foam product; the greater the ratio, the harder the produced foam). In practice, two separate streams of liquids (one of polyol, the other of isocyanate) are mixed together in the presence of a polymerization catalyst and a blowing agent in order to produce the desired polyurethane foam product.

The term "tertiary amine-based hydroxy-containing catalyst" is intended to encompass any gelation/blowing catalyst utilized within polyurethane production which comprises at least one amine constituent. As noted above, amine-based catalysts, and more specifically, tertiary amine catalysts, are widely utilized within such specific foam-producing methods. Two catalysts, in particular, DABCO TL, DABCO T10, and DMEA, are excellent gelation/blowing catalysts for this purpose; however, they also appear to be extremely reactive with and readily attack unmatched electrons on nitrogen-containing moieties. As noted above, oxidation by the amine readily occurs upon exposure to high temperatures, thus resulting in the undesirable scorched foam portions. Although any amine presents such a potential reactivity (oxidation) problem, and thus is contemplated within the scope of this invention, it has been found that the highly reactive tertiary amines present greater threats to discoloration and degradation to the final foam product. The amount of tertiary amine hydroxy-containing catalyst required to effectuate the desired urethane polymerization is extremely low, from between 0.05 php to about 1.00 php of the polyol content within the foam-making composition; more specifically, such a range is from about 0.07 php to about 0.60 php. Even though the number of free amines available are quite low, their ability to deleteriously affect the final foam product through oxidation of free reactive groups (hydroxyls, for example) within colorants, polyols, and other additives, is pronounced upon exposure to high temperature during polymerization.

Surprisingly, such discolorations and/or color degradations are substantially reduced and potentially eliminated through the simple extremely low addition of an organic cyclic ester within the foam-making procedure. Such a compound must be susceptible to ring opening upon exposure to the high foam-production temperatures and be thereafter be present as carboxylic acid within the same procedure. It is believed, without being bound to any specific scientific theory, that such carboxylic acids react more readily with the free reactive amines of the catalyst and thus quench the potential oxidation of the other free reactive groups present on other components of the foam-producing composition, all without affecting the rate of polymerization. Specific organic cyclic esters suitable for utilization for this purpose include, without limitation, lactones, cyclic carbonates, and basically any cyclic compound which exhibits ring opening upon exposure to heat of from about 50° C. to about 100° C.; more preferably from about 56° C. to about 95° C.; and most preferably from about 90° C. to about 95° C., and thereafter exists as a carboxylic acid. Any mixtures of such compounds may be utilized as well. Of greater importance, however, appears to be necessity of introducing such a compound (or compounds) in relatively low amounts within the foam-making composition. Thus, such a compound is within the polyol stream in an amount of between 0.001 php and 3.0 php, in relation to the total amount of polyol. Preferably, this level is between about 0.20 and 2.5 php; more preferably between about 0.35 and about 2.25 php; and most preferably between about 0.55 and about 2.0 php. The preferred organic cyclic esters include caprolactone, gamma-valerolactone, sigma-valerolactone, butyrolactone, propylene carbonate, and any mixtures thereof. Most preferred are caprolactone and butyrolactone.

As noted above, triphenylmethane polymeric colorants must be present within the inventive procedure and article. Such colorants are well known throughout the colored polyurethane foam industry and are more specifically taught within the Cross et al. U.S. Patent noted and incorporated herein, above. Other coloring agents may be also added within the different streams prior to reaction and/or polymerization as well. Such additions are well known within the industry to produce colored polyurethane foam articles in various colors and shades. Thus, the term "coloring agent" is intended to encompass any pigment, pigment dispersion, polymeric colorant (other than the required at least one triphenylmethane type), dye, dyestuff, any mixtures thereof, and the like, which provides desirable colorations to target polyurethane foam articles. In general, such coloring agents are added to the polyol stream (prior to reaction with the isocyanate) in amounts ranging from about 0.001 php to about 10 php. Higher color loadings may adversely affect foam performance. Suitable pigments for this invention include, without limitation, carbon black, lamp black, titanium dioxide, phthalocyanine, and the like. Suitable polymeric colorants for this purpose are disclosed within Cross et al., again without any limitation, and as merely examples. Suitable dyes and dyestuffs include reactive dyes, solvent dyes, vat dyes, and the like.

Other additives or solvents may also be present within the foam-making composition. Auxiliary blowing agents are required to provide the necessary foam blowing capability and reduce chances of combustion. Such compounds include methylene chloride, acetone, carbon dioxide (which may be liberated during the reaction between water and isocyanate), and the like, and are present in amounts of between about 1.0 php and 10 php of the entire foam-making composition. Water may thus also be added in relatively low amount (i.e., from about 3 to about 10 php; most preferably between about 3 and 5 php) to provide carbon dioxide for blowing purposes. Silicones may be added to provide desired cell structure and foam stability and are present in an amount from about 0.1 to about 2 php of the entire foam-making composition; preferably from about 0.9 to about 1.6 php.

The use of cyclic carbonates and cyclic lactones in polyurethane chemistry is known. U.S. Pat. No. 3,883,466 describes the use of a cyclic alkylene carbonate as a liquid modifier to moderate the reaction exotherm between the hydroxy component and the polyisocyanate in the production of a rigid, dense rapid-setting polyurethane. U.S. Pat. Nos. 4,709,002 and 4,731,427 describe the use of cyclic alkylene carbonates in the production of rigid RIM polyisocyanurate and urethane-modified polyisocyanurate parts. These two references do not indicate why cyclic alkylene carbonate is used but do suggest that the carbonate can be added to the isocyanate stream in order to reduce its viscosity. U.S. Pat. Nos. 5,028,635 and 5,149,458 report two polyurea-cyclic carbonate RIM systems having improved flow properties. European Patent 0,350,644 and U.S. Pat. No. 5,442,034 report similar applications for cyclic carbonate in RIM elastomers and spray polyurea elastomers, respectively. U.S. Pat. No. 4,812,523 describes high solids thermosetting coating composition with cyclic carbonates as reactive diluents to reduce viscosity. Cyclic carbonates and cyclic lactones have also been used as viscosity reducing agents in aromatic polyester polyols and polyether polyols (EP 0,276,452). There is no discussion or fair suggestion, however, of the addition of such extremely low amounts of organic cyclic esters for the purpose of quenching amine-based catalysts upon high temperature exposure during polyurethane foam-making procedures.

DESCRIPTION OF THE PREFERRED EMBODIMENT

A standard polyurethane foam article was first produced to investigate any scorch discolorations and/or degradations. Such a foam was produced through the reaction of the following components:

TABLE

| Component | Amount (php of the polyol content) |
| --- | --- |
| F3022 Polyol | 100 parts |
| Water | 4.53 |
| DABCO TL (catalyst) | 0.15 |
| DABCO T10 (catalyst) | 0.30 |
| L520 Silicone (from Witco) | 1.0 |
| 82/20 toluene diisocyanate | 43.6 |
| REACTINT ® Black X77 | 1.0 |

The black colorant is a mixture of polymeric colorants, including REACTINT® Blue X3LV, a triphenylmethane polymeric colorant comprising polyoxyethylene and polyoxypropylene chains. Upon mixture within a reaction vessel, the reaction created a "health" bubble (indicating gelation and blowing balance), and the vessel was then exposed to 185° C. (generated within a microwave oven to simulate actual temperatures encountered on an industrial production level) for about 10 minutes. The resultant foam bun was then sliced in half and analyzed empirically. A clear area of discoloration within the center of the bun and extending about 4 inches in each direction was immediately noticed. Also, the same area exhibited a brittle foam possessing characteristics totally different from that of the properly colored foam portions. Such a foam would be considered off-quality and thus would require disposal.

Three more foam buns were produced with the same proportions and types of components as above. However, these further foam buns were produced with the extra addition of about 0.55 php to 2.0 php of a) caprolactone, b) butyrolactone, and c) propylene carbonate. The resultant buns each exhibited marked improvements in color discoloration (no appreciable color differences were noted throughout the foam buns) and foam degradation (no brittleness was noted for any of the foam portions). Thus, these foams were acceptable.

While the invention will be described and disclosed in connection with certain preferred embodiments and practices, it is in no way intended to limit the invention to those specific embodiments, rather it is intended to cover equivalent structures structural equivalents and all alternative embodiments and modifications as may be defined by the scope of the appended claims and equivalence thereto.

What we claim is:

1. A colored polyurethane foam article exhibiting substantially the same color throughout said article, said article comprising at least one triphenylmethane-based polymeric colorant and at least some residue from a hydroxyl-terminated amine catalyst, wherein said article is produced from a reaction mixture of a polyol component and an isocyanate component said reaction mixture further comprising at least one triphenylmethane-based polymeric colorant and at least one organic cyclic ester present in an amount of 0.40 to about 2.0 php of the entire reaction mixture and at least one hydroxyl-terminated amine catalyst, wherein said reaction mixture is exposed to a temperature of at least about 165° C.

2. The article of claim 1 wherein said organic cyclic ester is selected from the group consisting of at least one lactone, at least one alkylene carbonates, and any mixtures thereof.

3. The article of claim 2 wherein said organic cyclic ester is selected from the group consisting of at least one lactone, and any mixtures thereof.

4. The article of claim 3 wherein said at least one lactone is selected from the group consisting of caprolactone, valerolactone, butyrolactone, and any mixtures thereof.

5. The article of claim 4 wherein said at least one lactone is caprolactone.

6. The article of claim 1 wherein said organic cyclic ester is present in an amount of at most 3.0 php of the entire reaction mixture.

* * * * *